US00RE49719E

(19) United States
(12) Reissued Patent
Coffman et al.

(10) Patent Number: US RE49,719 E
(45) Date of Reissued Patent: *Oct. 31, 2023

(54) MANAGING A VIRTUAL WAITING ROOM FOR ONLINE MEETINGS

(71) Applicant: Cisco Technology, Inc., San Jose, CA (US)

(72) Inventors: James E. Coffman, Boulder, CO (US); Jonathan Rosenberg, Freehold, NJ (US); Jorunn Aarseth, Oslo (NO); Keith Griffin, Galway (IE); John K. Restrick, Jr., Montclair, NJ (US)

(73) Assignee: CISCO TECHNOLOGY, INC., San Jose, CA (US)

( * ) Notice: This patent is subject to a terminal disclaimer.

(21) Appl. No.: 17/029,424

(22) Filed: Sep. 23, 2020

Related U.S. Patent Documents

Reissue of:
(64) Patent No.: 10,091,257
Issued: Oct. 2, 2018
Appl. No.: 14/618,015
Filed: Feb. 10, 2015

(51) Int. Cl.

| | |
|---|---|
| ***G06F 15/16*** | (2006.01) |
| ***H04L 29/06*** | (2006.01) |
| ***H04L 65/1093*** | (2022.01) |
| ***H04L 65/1069*** | (2022.01) |
| ***H04L 65/401*** | (2022.01) |
| ***H04L 65/403*** | (2022.01) |
| ***H04L 65/4053*** | (2022.01) |

(52) U.S. Cl.
CPC ..... *H04L 65/1093* (2013.01); *H04L 65/1069* (2013.01); *H04L 65/403* (2013.01); *H04L 65/4015* (2013.01); *H04L 65/4053* (2013.01)

(58) Field of Classification Search
CPC ..... H04L 65/1069; H04L 65/403; H04L 65/4015; H04L 65/1093; H04L 65/4053
See application file for complete search history.

(56) References Cited

U.S. PATENT DOCUMENTS

| | | | | |
|---|---|---|---|---|
| 6,839,417 | B2 * | 1/2005 | Weisman | H04M 3/563 455/416 |
| 7,478,129 | B1 * | 1/2009 | Chemtob | H04L 67/75 709/204 |
| 7,809,124 | B2 | 10/2010 | Archambault et al. | |
| 8,200,756 | B2 * | 6/2012 | Karniely | H04M 3/562 709/204 |
| 8,355,489 | B2 | 1/2013 | Gartner et al. | |
| 8,880,598 | B2 | 11/2014 | Sekaran et al. | |

(Continued)

OTHER PUBLICATIONS

Gatekeeper Software Solutions, LLC, "Prime Virtual Waiting Room", http://www.gatekeeperwebsolutions.com/prime-virtual-waiting-room, Retrieved Nov. 3, 2014, 3 Pages.

*Primary Examiner* — Ovidio Escalante
(74) *Attorney, Agent, or Firm* — Edell, Shapiro & Finnan, LLC

(57) ABSTRACT

A server or other computing device manages meetings in a virtual meeting room on behalf of a virtual meeting room owner. A request is received from an attendee to join a meeting in the virtual meeting room. A determination is made, based on configurations set by the virtual meeting room owner, whether to connect the attendee to a virtual waiting room. The attendee is connected to the virtual waiting room in accordance with the configurations set by the virtual meeting room owner.

64 Claims, 17 Drawing Sheets

(56) References Cited

U.S. PATENT DOCUMENTS

| | | | | |
|---|---|---|---|---|
| 8,938,677 | B2 | 1/2015 | Geppert et al. | |
| 2005/0254440 | A1* | 11/2005 | Sorrell | H04L 65/1101 348/14.08 |
| 2006/0182249 | A1* | 8/2006 | Archambault | H04L 12/1818 379/202.01 |
| 2007/0208806 | A1* | 9/2007 | Mordecai | G06Q 10/10 709/204 |
| 2011/0300841 | A1 | 12/2011 | Archambault et al. | |
| 2012/0011249 | A1* | 1/2012 | Wong | G06Q 10/10 709/224 |
| 2012/0103568 | A1 | 5/2012 | Jewell-Larsen et al. | |
| 2012/0110475 | A1* | 5/2012 | Han | H04L 12/1818 715/753 |
| 2012/0204118 | A1* | 8/2012 | Lefar | G06F 3/04883 715/756 |
| 2012/0331401 | A1 | 12/2012 | Tipirneni | |
| 2013/0254279 | A1 | 9/2013 | Bentley et al. | |
| 2014/0013413 | A1* | 1/2014 | Roher | G06Q 10/02 726/12 |
| 2014/0181696 | A1* | 6/2014 | Christensen | H04L 12/1818 715/756 |
| 2014/0222907 | A1 | 8/2014 | Seligmann et al. | |

* cited by examiner

MANAGING A VIRTUAL WAITING ROOM FOR ONLINE MEETINGS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*More than one reissue application has been filed for U.S. Pat. No. 10,091,257. This Reissue Application is related to a co-pending Divisional Reissue Application, filed on Sep. 25, 2020, U.S. application Ser. No. 17/032,439.*

TECHNICAL FIELD

The present disclosure relates to the operation of personal meeting rooms.

BACKGROUND

Modern collaboration systems often provide virtual "personal meeting rooms" which can be assigned to individuals for their own (business) use. These rooms are dedicated to a single owner (even if the underlying resources are shared) so the owner does not have to schedule room use with server resources. The resources that support the virtual meeting room appears to be dedicated to the meeting room owner. Thus, it is common for a virtual meeting room owner to plan meetings back-to-back in his/her virtual meeting room.

A modicum of security is provided in that meetings do not start until the room owner joins and provides a password or other sort of secret to unlock and open the room. Once the owner is connected/logged into the virtual meeting room, others can join the meeting room without constraint. This can be a problem because meetings often run beyond their scheduled end time, and invitees to the next meeting in the personal meeting room will join the meeting in progress, causing confusion and possibly hearing/seeing information not intended for them.

DESCRIPTION OF EXAMPLE EMBODIMENTS

Overview

Figure 1:
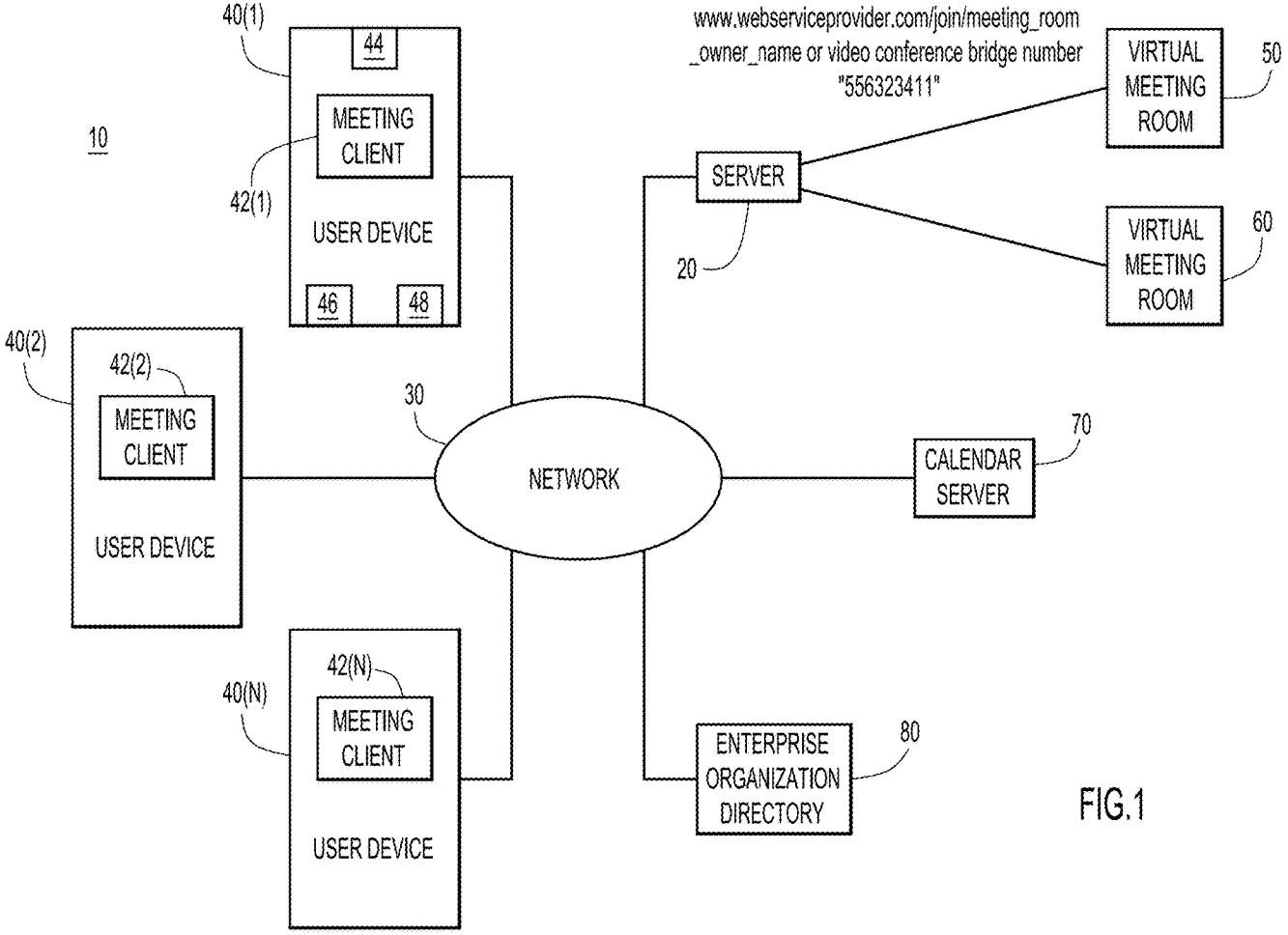
FIG. 1 is a block diagram of a system to support virtual personal meeting room/personal video conference bridge collaboration with a virtual waiting room, according to an example embodiment.

In one embodiment, a server or other computing device manages meetings in a virtual meeting room on behalf of a virtual meeting room owner. A request is received from an attendee to join a meeting in the virtual meeting room. A determination is made, based on configurations set by the virtual meeting room owner, whether to connect the attendee to a virtual waiting room. The attendee is connected to the virtual waiting room in accordance with the configurations set by the virtual meeting room owner.

Example Embodiments

Presented herein are embodiments for a virtual waiting room. The virtual waiting room allows a single virtual meeting room to be used for adjacent meetings while avoiding the problem of participants of the second meeting inadvertently joining an earlier meeting that is running beyond its planned end time. Often when attendees join early it results in an unintentional barge-in on the previous meeting. The virtual waiting room may also be used when virtual meeting room is not already in use, but the host or meeting room owner has not yet logged into the virtual meeting room. The virtual waiting room allows meeting participants to be collected until the meeting room owner is available to join the meeting. The virtual waiting room involves the allocation of resources to support some connectivity state with respect to the joining attendees. There is a range of functions that may be provided by the virtual waiting room, as described below. It is appreciated that as more functions are provided in the virtual waiting room, more computing/connectivity resources of a meeting server/video conference bridge would be needed.

It is advantageous to keep the virtual waiting room simple to use but have (optionally) available all the modes of interactions familiar from real-world waiting rooms. More specifically, presented herein are embodiments for the waiting room to become ready for attendees/invitees, for waiting room attendees to interact with each other while in the virtual waiting room, and for meeting room owner interactions with the virtual waiting room interactions.

In one form, the virtual meeting room may be supported by web-based meeting resources dedicated to a particular user, called the virtual meeting room owner. In this case, the virtual meeting room is accessed via web-based resources, and there is a universal resource link (URL) uniquely dedicated to a particular user who is the virtual meeting room owner. The virtual meeting room is said to be a personal or private virtual meeting room. In another form, the virtual meeting room may be supported by video conference bridge resources dedicated to a particular user. In this case, the virtual meeting room is a personal video conference bridge number uniquely dedicated to a particular user who is the virtual meeting room owner, and the virtual meeting room is accessed via video conference bridge resources. In either case, whether a web-based meeting resources or video conference bridge resources, essentially a single resource is allocated to an "owner" or "host" and to access it attendees need to simply enter or click on a URL, e.g., https://www.webserviceprovider.com/join/meeting_room_owner_name, or by dialing or entering a video conference bridge number (or perhaps entering a PIN).

Referring first to FIG. 1, a high level diagram is shown of a system 10 that supports the virtual waiting room embodiments presented here. The system includes a server 20 that communicates, via network 30, with a plurality of user devices 40(1)-40(N). Each user device 40(1)-40(N) runs a meeting client application 42(1)-42(N), respectively. The user devices 40(1)-40(N) may take on a variety of forms, including, without limitation, a desktop computer, a laptop computer, a smartphone, a tablet computer, a thin client device, a dedicated video terminal, etc. Each user device may further include a video camera 44, a microphone 46 and a loudspeaker 48. Moreover, each user device may include a physical keyboard or software keyboard and mouse/pointing device or feature. For simplicity, these components are shown only on user device 40(1), though it is to be understood that user devices 40(2)-40(N) may also include these components. In still another example, a user device may be a video conference endpoint having an integrated camera and microphone.

The meeting client applications 42(1)-42(N) may be a browser application (with any suitable plug-in software), a smartphone application, a tablet application, or a hosted virtual desktop application running in a data center (cloud computing environment) on behalf of a thin client device. The network 30 may include any combination of a wired wide area network, wireless wide area network, wired local area network, wireless local area network, etc.

The server 20 executes software to support virtual meeting rooms or a personal video conference bridge to which users can connect via their respective user devices 40(1)-40 (N). The virtual meetings may include audio and/or video of the respective users, as well as shared content (documents, data, audio, and video) among a plurality of user participants during a meeting. A given user may be assigned his own personal virtual meeting room such that any meeting he/she scheduled is conducted in that personal meeting room. He/she is said to be the owner of his/her personal meeting room. The term "host" also corresponds to the meeting room owner in this context. A user can personalize his/her virtual personal meeting room with various attributes. In accordance with embodiments presented herein, the server 20 may support both a virtual meeting room pictorially represented at reference numeral 50 and a virtual waiting room pictorially represented at reference numeral 60 for a virtual meeting room owner. For example, the virtual meeting room 50 may be associated with the URL https://www.webserviceprovider.com/join/meeting_room_owner-_name, or with a particular video conference bridge number (a sequence of numbers of a predetermined length, e.g., 556323411). As explained further hereinafter, the server 20 instantiates a virtual waiting room for a meeting room owner when attendees for a next meeting hosted by the meeting owner connect to the server to join the next meeting when there is a meeting still in progress in the virtual meeting room, or when there is no in-progress meeting but the owner has not yet connected to server to open the virtual meeting room.

The server 20 also communicates, via network 30, with a calendar server 70 and an enterprise organization directory 80. The calendar server 70 maintains schedules for users, including scheduling of virtual meetings supported by the meeting server 20. The enterprise organization directory 80 stores data for users in an enterprise organization and relationships between users, e.g., corporate organizational hierarchy.

The server 20 may be a meeting server that manages the operations of web-based meetings, or a video conference bridge that manages operations of video conferences (which can also support content sharing and other features that are available in web-based meetings).

Figure 2:
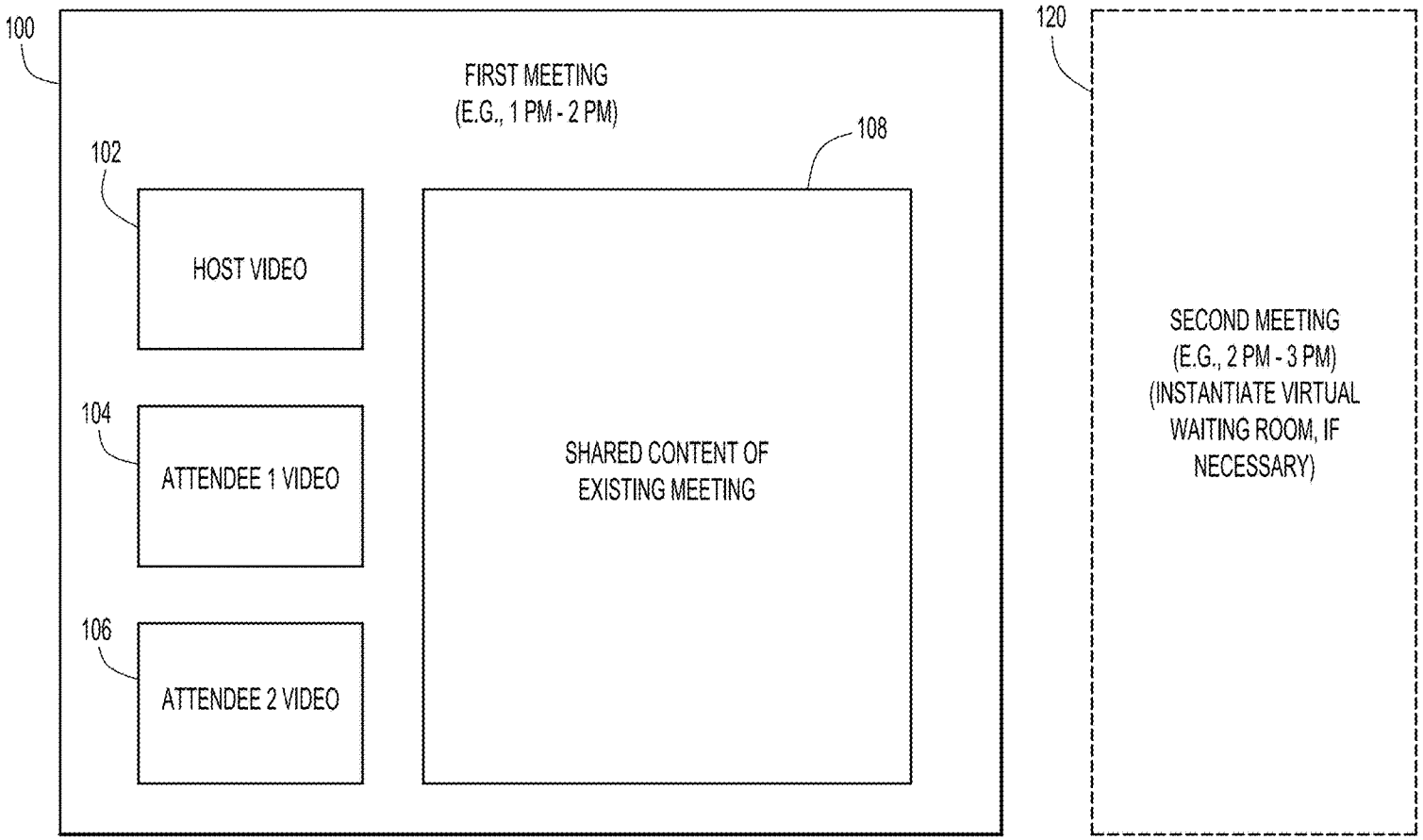
FIG. 2 is a diagram illustrating an example user interface for an in-progress meeting that may run up against a meeting planned immediately after the in-progress meeting, according to an example embodiment.

Reference is now made to FIG. 2. FIG. 2 shows an example user interface (UI) screen for a first meeting, called an existing meeting, shown at reference numeral 100. The UI 100 for the existing meeting includes allocated regions for video for the various meeting participants, including a region 102 for video for the meeting host, region 104 for video for attendee 1 and region 106 for attendee 2. In addition, there is a region 108 for a participant to share content. For example, a meeting attendee may share content at any given time during the virtual meeting.

For purposes of explanation, the first meeting, meeting 1, is from 1-2 pm and a second meeting, meeting 2, is planned for 2-3 pm. The virtual meeting room is not scheduled, rather it is dedicated to the meeting room owner. However, the meeting room owner typically notifies attendees of the planned meeting time and meeting room identifier (e.g., a universal resource locator) for joining purposes. The meeting room may have no awareness of the identification of invitees.

Operation is as follows. The meeting room owner enters the virtual meeting room for meeting 1. Any participants can join the virtual meeting room once the owner enters the meeting room, that is, once the owner logs into the meeting room.

At some point towards the end of meeting 1, the behavior of the room changes. From this time on, new attendees do not enter the virtual meeting room (even though the owner is in the room). This is because such attendees that join typically towards the very end of a meeting are connecting for the next meeting, and not for the existing meeting. Thus, attendees attempting to join at this point forward are staged in a "virtual waiting room" and the owner may signaled that people are waiting for the next meeting. FIG. 2 shows at reference numeral 120, in dotted line, the meeting room for meeting 2, yet to be started. This is for illustration purposes only. If attendees for meeting 2 join while meeting 1 is still in-progress (towards the end of meeting 1), the virtual waiting room will be instantiated and the attendees for meeting 2 are connected into the virtual waiting room according to configurations set by the meeting room owner.

The virtual meeting room operation changes as it approaches a "meeting boundary"—the time when one meeting ends and the other begins. After a meeting has lasted for some minimum time with the room owner and at least one other attendee, the waiting room is enabled to be opened, either automatically or manually. There are several ways to mark this boundary time, as described below.

Figure 3:
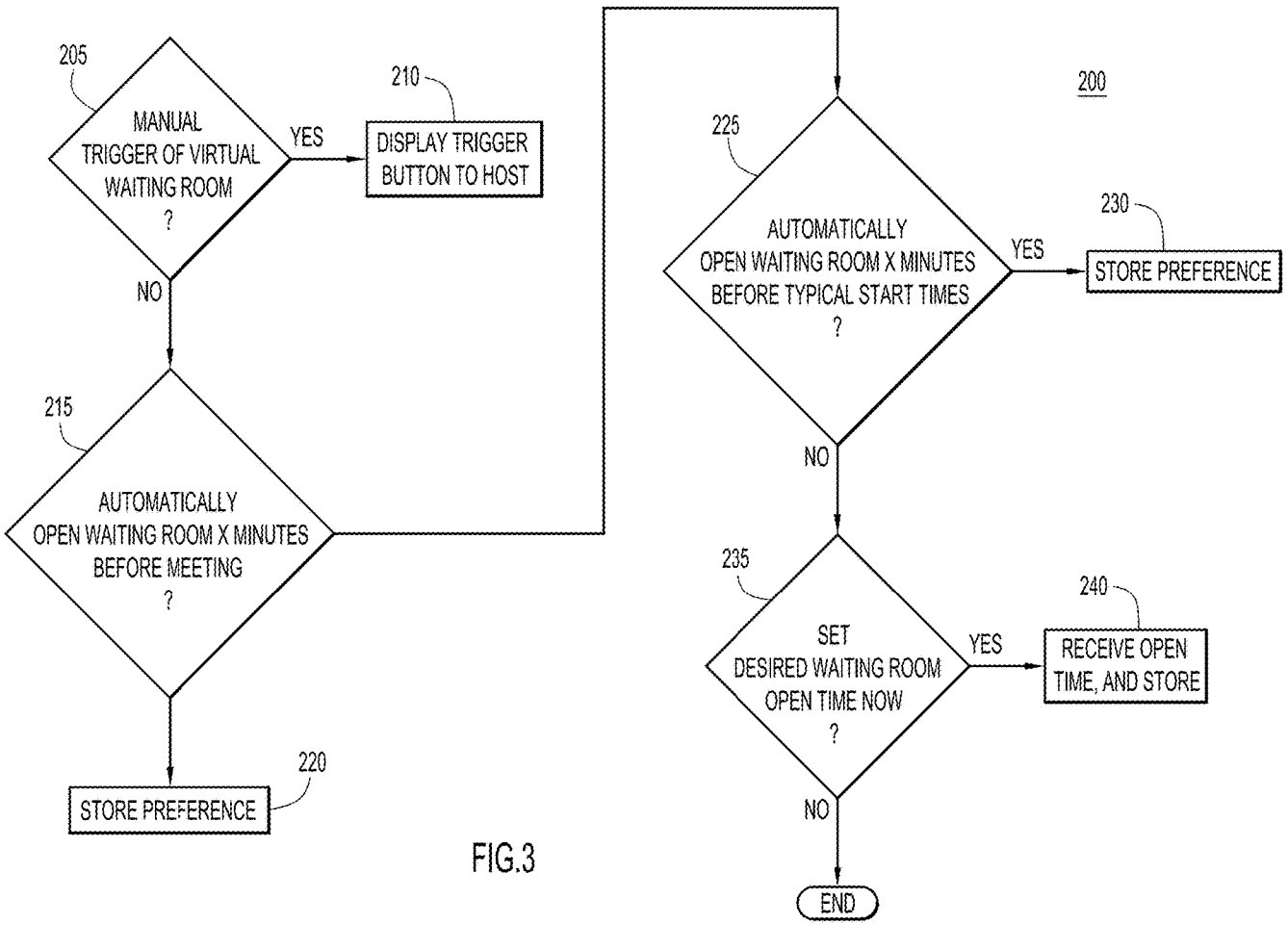
FIG. 3 is a flow chart illustrating a method for receiving from a virtual meeting room owner configurations for a virtual waiting room associated with the virtual meeting room, according to an example embodiment.

Reference is now made to FIG. 3. FIG. 3 illustrates a flow chart for a configuration process 200 by which the meeting room owner may set configurations for instantiating a virtual waiting room associated with his/her virtual meeting room. The process 200 may be performed at any time so that the meeting room owner can make changes/updates to the configurations for the virtual waiting room. At 210, it is determined whether the meeting room owner wishes to manually trigger the virtual waiting room when needed. If manual instantiation of the virtual waiting room is desired by the meeting room owner, then at 210, the meeting server will display a trigger button or other user interface element that is displayed to the meeting room owner when attendees to the next meeting join towards the end of an existing meeting that is still in-progress. Otherwise, the process continues to 215.

With the manual instantiation of the virtual waiting room, the room owner could realize that the second meeting will be starting soon and set an "open waiting room" indication so that the waiting room will be used for any attendees that join the virtual meeting room from that time onward. An explicit notification informs attendees to wait and they will be automatically entered into the meeting room (from the virtual waiting room) when the previous meeting ends. They do not have to retry to join the second meeting.

At 215, the meeting room owner is given the option of having the waiting room automatically open X (e.g., 5) minutes before the start of a planned meeting. The meeting room owner can select the value for X, and this information is stored at 220 by the meeting server. With this configuration, the virtual waiting room automatically opens X minutes before the start of the planned meeting and any attendees that join the meeting room from that point onward are directed into the virtual waiting room.

At 225, if the meeting room owner does not choose the option at 215, the option is presented to the meeting room owner to automatically open the waiting room X minutes before typical meeting start times, e.g., on the hour or half-hour. At 230, if this option is selected, information is stored by the server. Thus, at 225 and 230, the meeting room operation may change at the times that meeting conventionally end (typically the end of the hour or half hour—controlled by a user setting). The waiting room automatically opens a pre-specified number of minutes before this time.

If the meeting room owner does not choose option 225, then at 235, the option is presented to set a desired/predetermined waiting room open time. This may be set for a specific planned meeting on an ad hoc basis when the meeting room owner sends out an invite for a meeting. At 240, the server receives the predetermined time from the meeting room owner at which to open the waiting room, and stores this information. This could be integrated with an existing calendar scheduler. The meeting room uses a pre-specified time before the time of next meeting to automatically open the waiting room for attendees.

Once the existing meeting (meeting 1) ends (e.g., 3 minutes after 2 pm) and people in that meeting have exited the room, the room owner can signal the server to let the people in the virtual waiting room enter virtual meeting room for the next meeting (meeting 2). They enter as usual and the next meeting starts. If an attendee from meeting 1 is also invited to meeting 2 he or she can simply stay in the room as the owner admits people from the waiting room to start meeting.

Figure 4A:
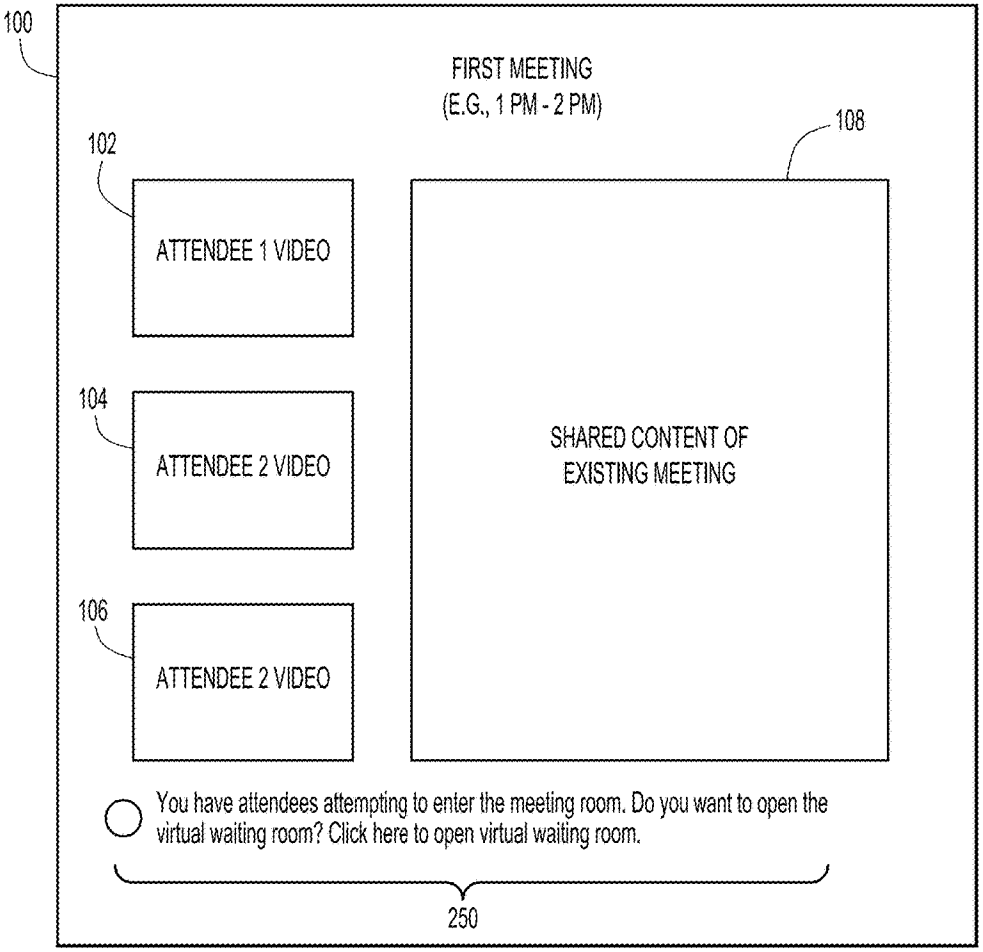
FIG. 4A is a diagram illustrating an example user interface for an in-progress meeting and showing in particular a notification and user interface element to allow the meeting room owner to open the virtual waiting room, according to an example embodiment.

FIG. 4A illustrates, at reference numeral 250, an example user interface element and notification presented to the meeting room owner, in accordance with the configuration set at step 210 in FIG. 3. The notification and user interface button are presented to the meeting room owner only during an existing meeting, and includes text to explain that there are attendees waiting for the next meeting, and that the meeting room owner can click a button to open the virtual waiting room so that those attendees/invitees who are waiting can be connected to the virtual waiting room. In other words, analogous to a real meeting room, the notification at 250 informs the meeting room owner that there are one or more invitees who have requested to enter the room, but have not been allowed to enter yet. In another example, the virtual waiting room may be automatically opened (auto-starts) as people attempt to join the main meeting room, in which case the meeting room owner/host is notified appropriately.

Still another virtual waiting room option that can be used to determine the virtual waiting room experience for attendees and the meeting room owner, is based on whether there is access to the list of invitees to the next meeting for which the virtual waiting room may be needed. If the server has access to the names/identifiers of the invitees for the next meeting, then those persons may be handled differently in terms of their access to the virtual waiting room. For example, persons who were on the original list of invitees set up by the meeting room owner may be automatically put into the virtual waiting room when they join and an existing meeting is in process in the meeting room. Conversely, persons who were not on the original list of invitees but obtain the invitation (perhaps forwarded from an invitee on the original list) do not get automatically directed into the virtual waiting room. They simply are notified that the meeting room is not available, and are advised to attempt to log in again later. In still another example, if an invitee is invited to both the current meeting (but has not joined it yet) and the next meeting, the invitee is admitted to the current meeting.

As still a further variation, certain attendees who have a predetermined position within an organization or predetermined relationship to the meeting owner or to other attendees of a meeting may be handled differently in terms of their access to the virtual meeting room. For example, if a person who is in the senior leadership of an organization or the "boss" of the meeting owner joins a meeting room while another meeting is in-progress, the meeting server would recognize the importance of such persons and automatically place them in the virtual meeting room, and present a notification (audio or text) only to the meeting room owner in the existing meeting, the notification indicating that persons of high importance (perhaps including their names) have joined and are in the virtual waiting room.

Figure 4B:
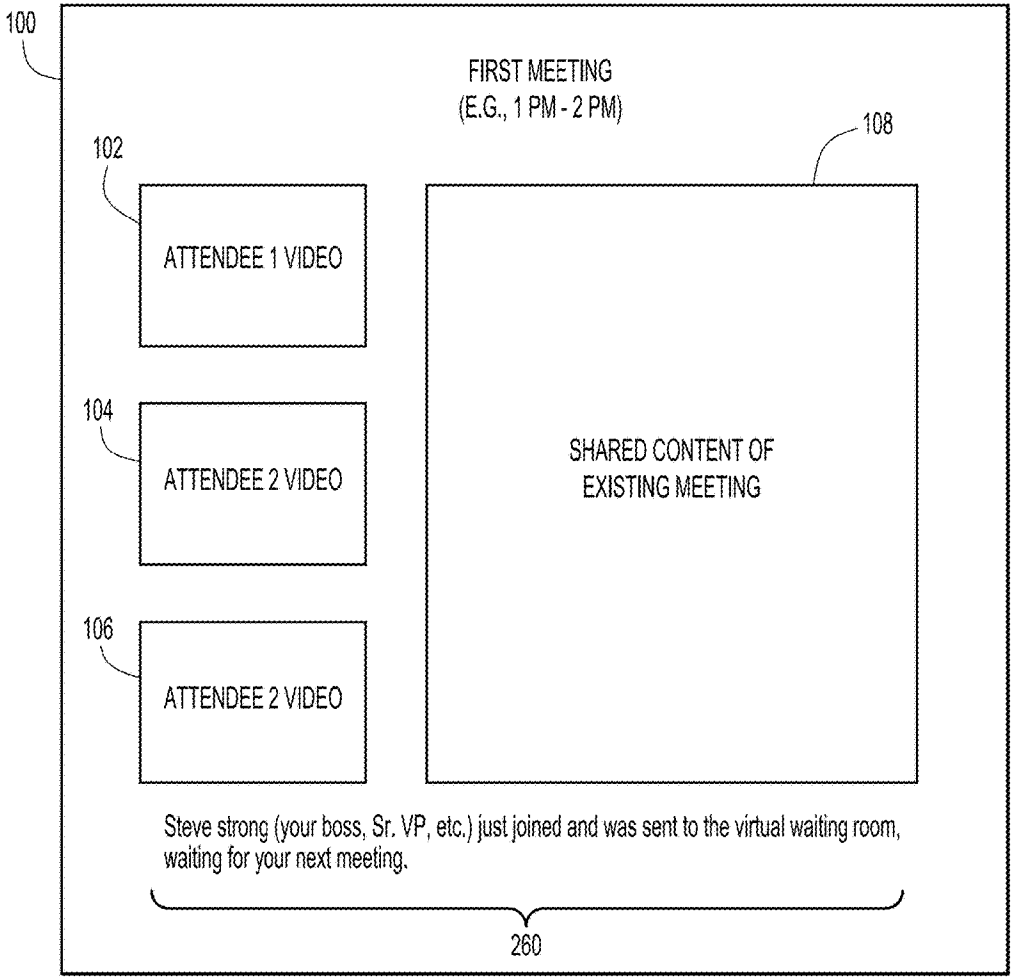
FIG. 4B is a diagram similar to FIG. 4B, but showing a notification to the meeting room owner indicating that a particular attendee is in the virtual waiting room, according to an example embodiment.

FIG. 4B illustrates an example notification 260 that may be presented to the meeting room owner when a senior executive or the meeting room owner's "boss" has joined for the next meeting. The notification indicates the name of the person who has joined and his/her title or relationship to the meeting room owner, and also indicates that person has been sent the virtual waiting room, waiting for the start of the next meeting. This will alert the meeting room owner to finish the existing meeting promptly so that he/she does not keep the important person waiting too long in the virtual waiting room.

It should be understood that the virtual waiting room embodiments presented herein may be useful when the virtual meeting room owner has not yet connected to the virtual meeting room, not just because he/she is in another meeting in the virtual meeting room. For example, the virtual meeting room owner may be away from his user device, in another meeting outside of his/her virtual meeting room, etc.

Figure 5:
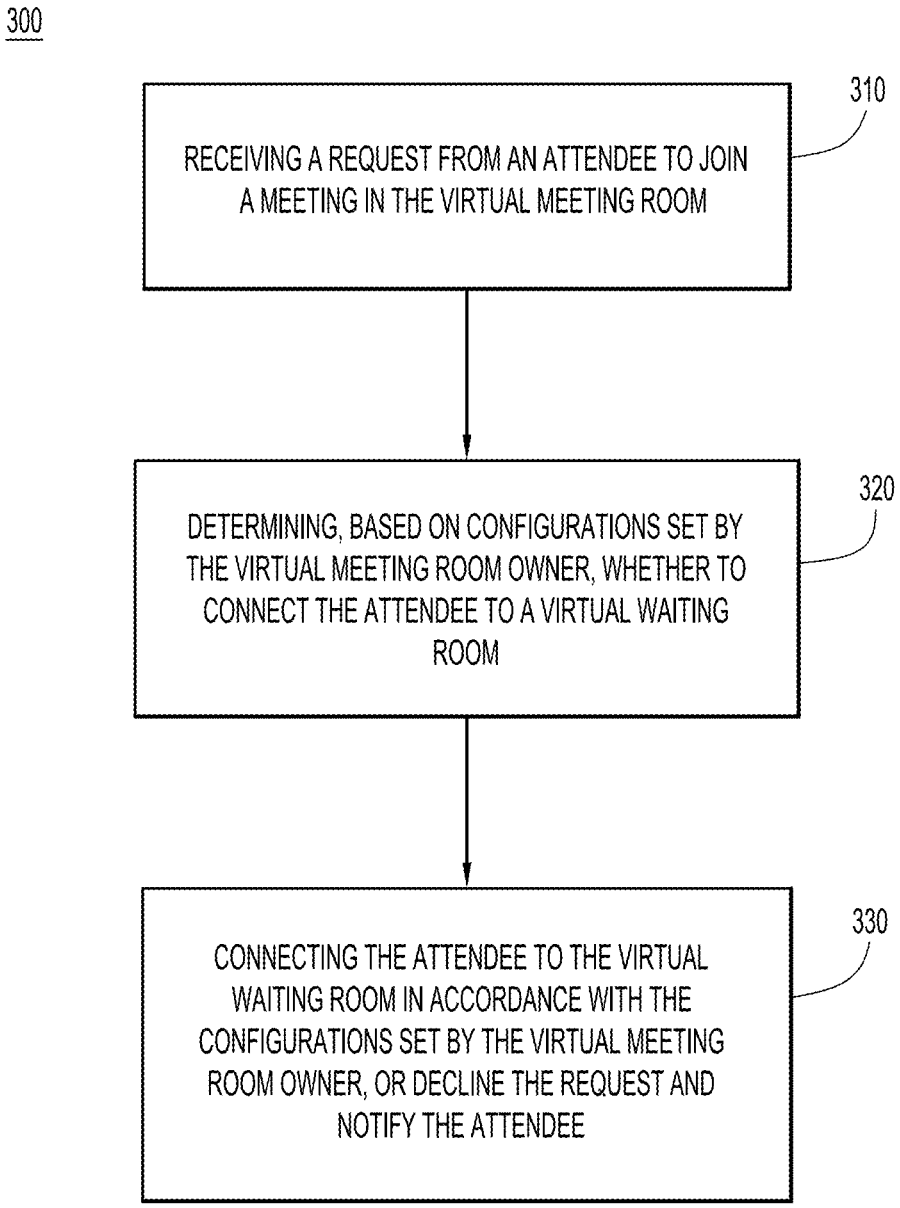
FIG. 5 is a high-level flow chart depicting operations for the virtual waiting room, according to an example embodiment.

FIG. 5 illustrates a flow chart for a method 300 performed by the server that manages meetings in a virtual meeting room on behalf of a virtual meeting room owner (host). In particular, the method 300 involves operations performed by the server in determining whether persons are connected into a virtual waiting room when they join for a meeting in the virtual meeting room either at a time when another meeting is in progress in the virtual meeting room or when the virtual meeting room owner has not joined the meeting for other reasons. At 310, a request is received from an attendee to join a meeting in the virtual meeting room. At 320, the meeting server determines, based on configurations set by the virtual meeting room owner, whether to connect the attendee to a virtual waiting room. At 330, the server connects the attendee to the virtual waiting room in accordance with the configurations set by the virtual meeting room owner. If the attendee request to connect to the virtual meeting room/waiting room is denied, a notification would be presented to the attendee (e.g., "Your Request to Enter the Meeting Room is Denied.")

Figure 6:
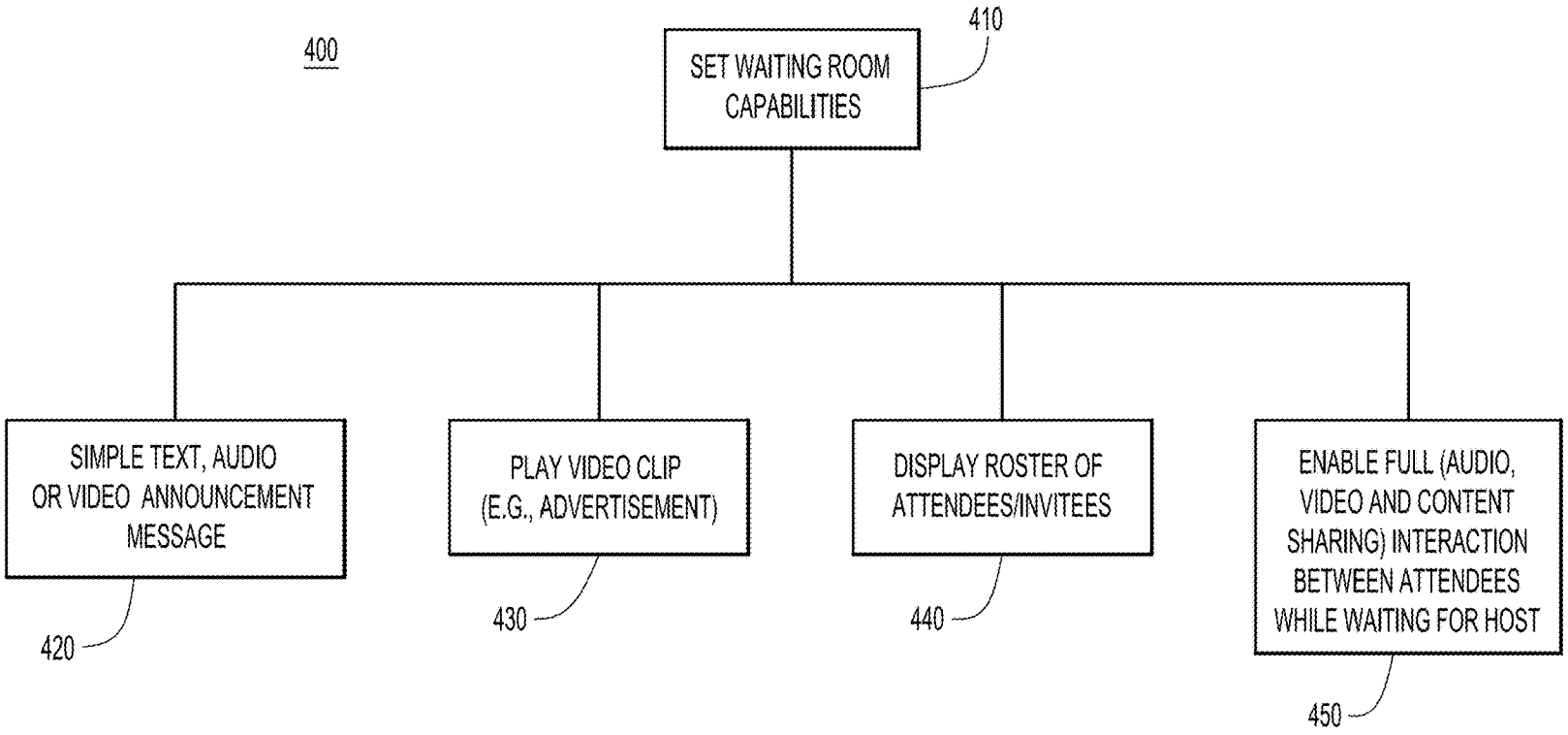
FIG. 6 is a flow diagram for setting capabilities/functions of the virtual waiting room, according to an example embodiment.

The operations of the virtual waiting room can vary according to tradeoffs between resource consumption and waiting experience. Reference is now made to FIG. 6. FIG. 6 illustrates a flow chart 400 that depicts the various operations that are possible in the virtual waiting room, and which may be configurable by the virtual meeting room owner. The process starts at 410 where the virtual meeting room owner sets the capabilities of the virtual waiting room. At 420, a configuration can be set in which a simple text and/or audio message is played out to the invitees/attendees in the virtual waiting room. The message may be as simple as "Your meeting will start once the host joins. Please wait here in the virtual waiting room. Thank you." The video message may be of the meeting room owner.

Figure 7A:
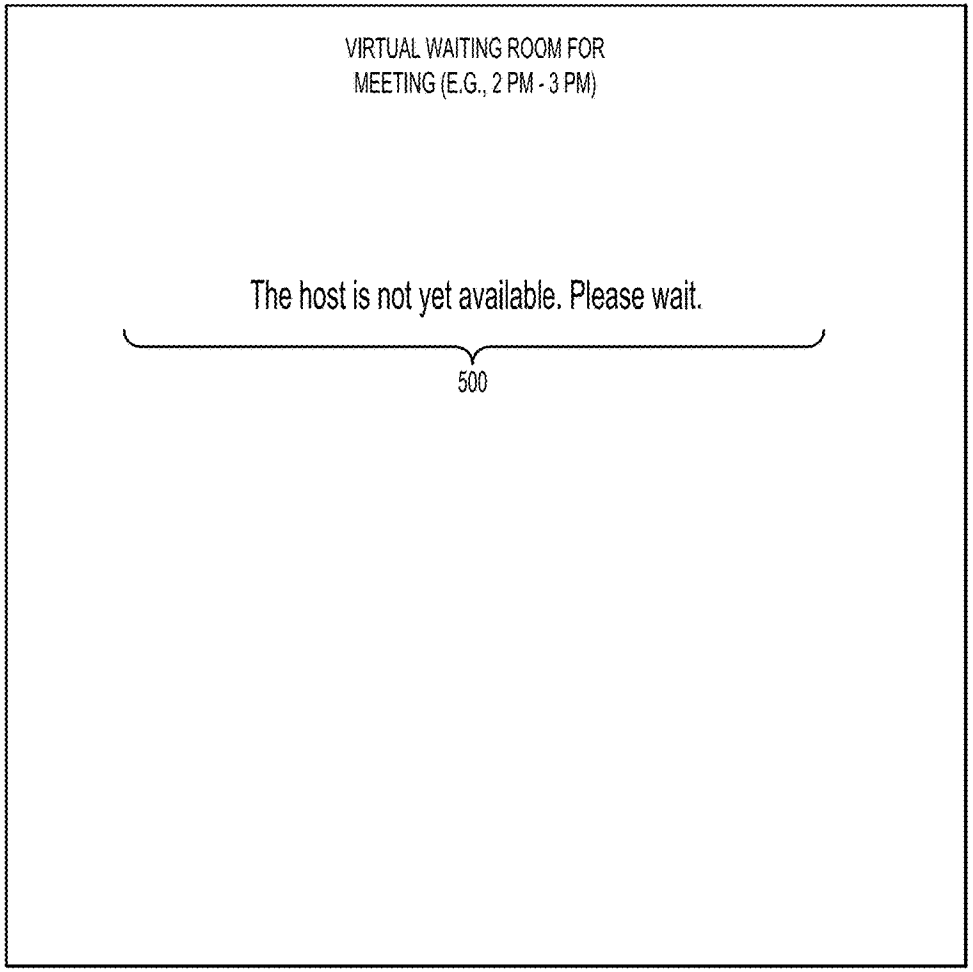
FIG. 7A illustrates a user interface presented to attendees waiting in the virtual waiting room, according to an example embodiment.

FIG. 7A shows an example of a text message displayed to users who are connected to a virtual waiting room. The message, shown at reference numeral 500, may simply state: "The host/meeting room owner is not yet available. Please wait." In addition to or instead of a text message, the meeting server may play out an audio or video message explaining that the room owner is not yet available, either because he/she is finishing a previous meeting or because he/she is away and has not connected to the system yet. That message may be repeated to ensure the attendees realize they should wait. The waiting attendees have no way to interact with each other.

At 430, a configuration can be set in which a video program/segment is played to those in the virtual waiting room.

Figure 7B:
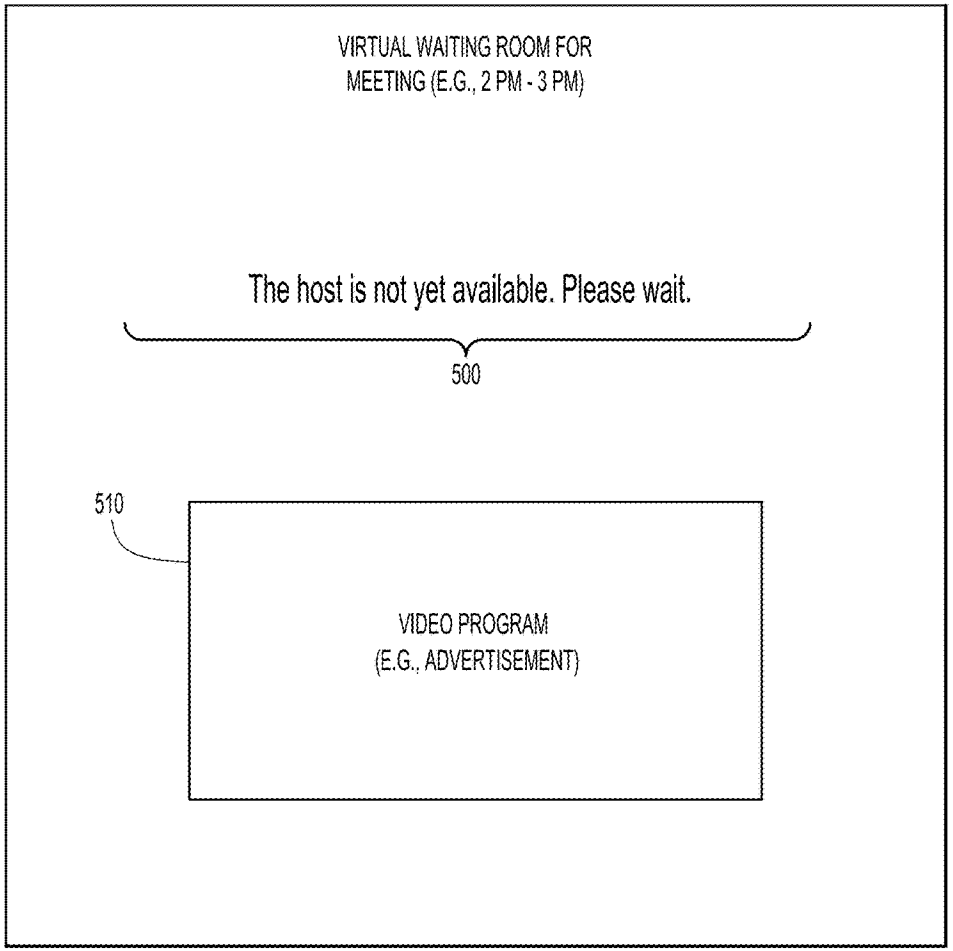
FIG. 7B illustrates a user interface including a video program presented to attendees waiting in the virtual waiting room, according to an example embodiment.

FIG. 7B shows a video program 510 may be played out to the attendees. The video program may be an advertisement promoting a product or service, an instruction video, a company video memorandum, etc. The text message 500 indicating that the attendees should wait, may also be presented. Again, the waiting attendees have no way to interact with each other in this example.

At 440, a configuration may be set to display a roster/list of the attendees/invitees who are in the virtual waiting room. This may be useful so that people can see who else has already joined a planned meeting and is waiting in the virtual waiting room.

Figure 7C:
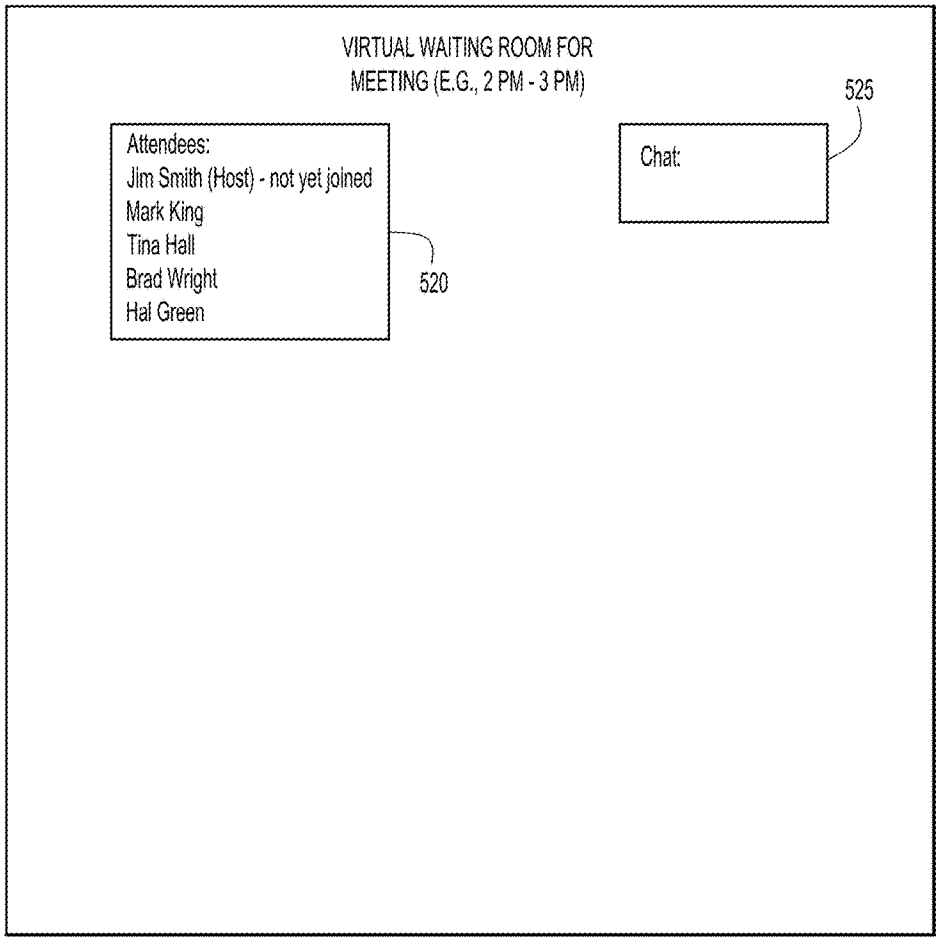
FIG. 7C illustrates a user interface including a list or roster of attendees who are in the virtual waiting room, according to an example embodiment.

FIG. 7C illustrates a list or roster of attendees/invitees who are in the virtual meeting room is shown. The list or roster, shown at reference numeral 520, is displayed to the attendees so each attendee knows who else has already joined the meeting. The meeting room owner/host's name is shown in italics to indicate that he/she has not yet joined. The attendees may or may not have the ability to interact with each other. For example, the attendees may have the ability to chat with each other, as shown at reference numeral 525.

At 450, a configuration may be set to enable full (audio, video and content sharing) interaction between attendees in the virtual waiting room while waiting for the meeting owner to end a meeting in-progress in the virtual meeting room. This allows the persons who are connected to the virtual waiting room to begin conducting business amongst themselves. Once the meeting room owner joins, all of the attendees in the virtual waiting room are seamlessly moved into the virtual meeting room, with all functions (recording, content sharing, video, audio) that were ongoing on the virtual waiting room continuing, uninterrupted, in the virtual meeting room.

Figure 7D:
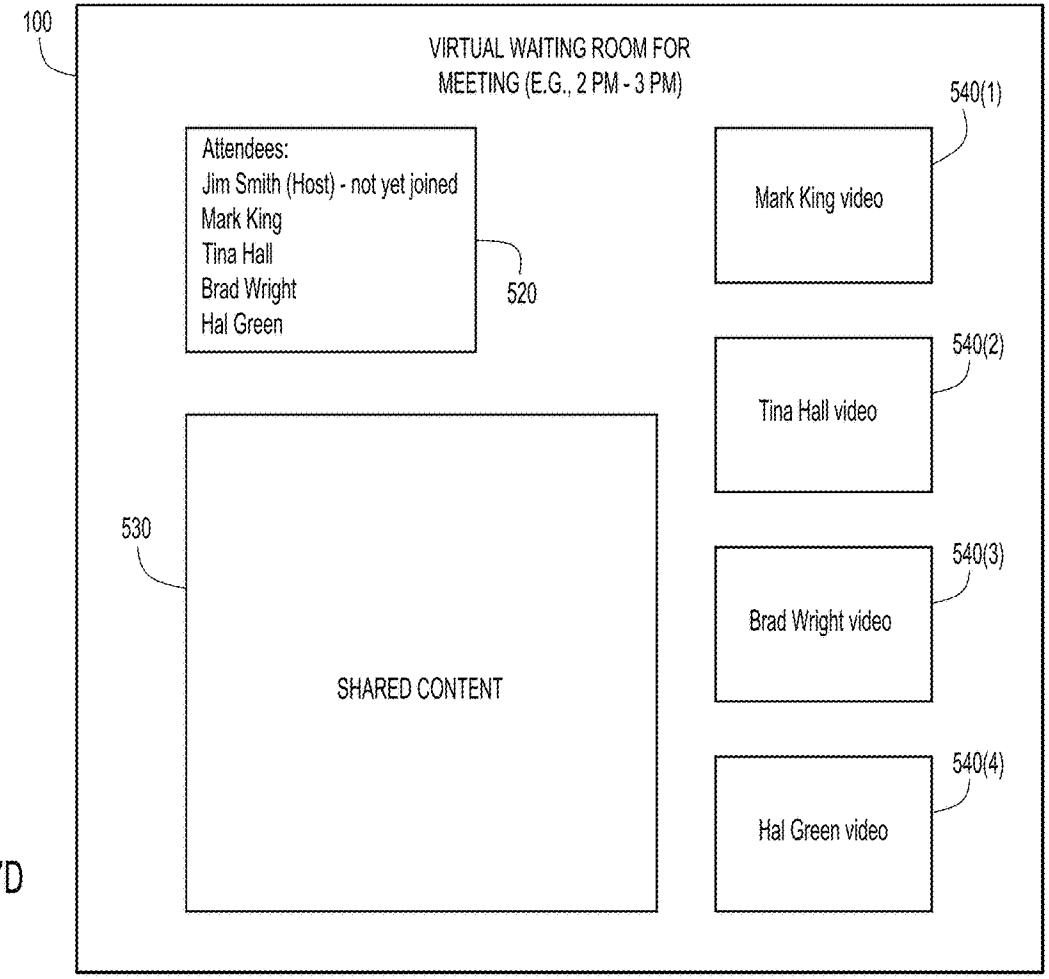
FIG. 7D illustrates a user interface for the virtual waiting room that enables full audio, video and content sharing capabilities among the attendees waiting in the virtual waiting room, according to an example embodiment.

FIG. 7D illustrates a version of the virtual waiting room in which full audio, video and content sharing interaction is enabled among attendees. Icons may be presented next to each attendee's name in the roster 520 to indicate who is speaking at any moment. There is a shared content window 530 that allows any attendee to share content for viewing by other attendees. In addition, video from each of the attendees may be presented, as shown at reference numerals 540(1)-540(4). Thus, FIG. 7D illustrates an example in which the waiting attendees may be placed in a virtual waiting room that has all the capabilities of the virtual meeting room—they can see, and hear each other for example. A splash screen and an on-screen reminder may be presented to explain that the meeting has not yet started but attendees can interact as they would expect in a virtual meeting room.

Any combination of the configurations shown in FIG. 7A-7D may be possible.

In all of the configurations described herein, once the virtual meeting room owner joins the meeting (either by ending the prior meeting in the virtual meeting room or logging in to the meeting server and starting the planned meeting), the virtual waiting room is at that point closed so that anyone else who joins the meeting will join the virtual meeting room.

In all these virtual waiting room capabilities examples, waiting attendees are signaled that the room owner is not yet available and they should wait. The server may also notify the room owner, in an in-progress meeting, that attendees for the next meeting are waiting.

In accordance with the embodiments described herein in connection with FIGS. 1-7A-7D, attendees are automatically directed into the virtual waiting room, according to configurations set by the meeting room owner, or according to default configurations. The meeting room owner does not have to make decisions about referring attendees to the waiting room, etc. The meeting room owner may be notified that there are waiting attendees but does not have to act on that information. This simplifies use of the meeting room and avoids unnecessary meeting interruptions, particularly when a meeting room owner has back-to-back meetings.

Figure 8:
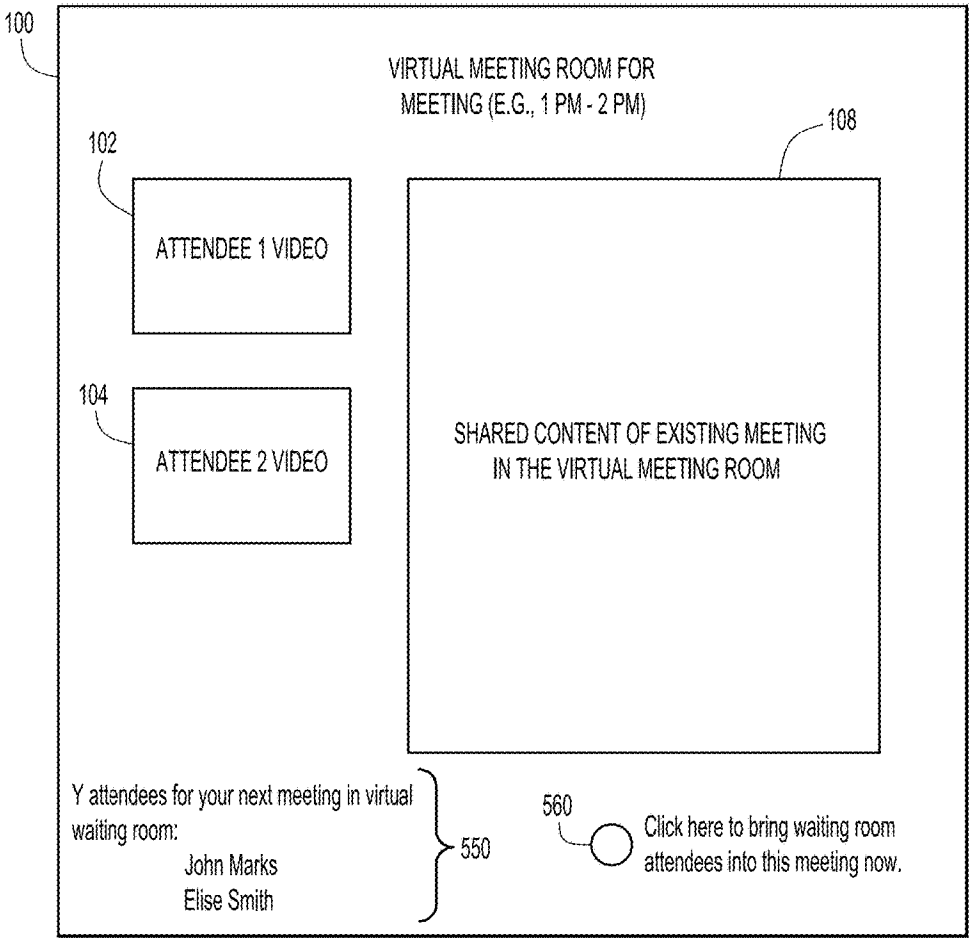
FIG. 8 illustrates a user interface presented to a meeting room owner during an in-progress meeting and including a notification of the number and names of attendees in the virtual waiting room, according to an example embodiment.

Reference is now made to FIGS. 8 and 9A-9D for examples of interactions between the meeting room owner and a waiting attendee. Referring first to FIG. 8, in this example, virtual meeting room 100 includes attendee video 102 and 104 and shared content 108. At reference numeral 550 is a textual notification to the meeting owner indicating that there are other attendees for the next meeting in the virtual waiting room. The names of the attendees in the virtual waiting room may also be included in the textual notification 550. There is no direct interaction between the meeting room owner and the waiting attendees in this example. The meeting room owner is only notified that there are waiting attendees, and possibly their identities.

The meeting room owner/host may be notified that people are arriving and waiting by a second active presence screen on their display. The host may also prompted to message the attendees with an expected start time (like "running over, meeting starting in 2 minutes"). This can be implemented using an Extensible Messaging and Presence Protocol (XMPP) messaging infrastructure. The host may be presented with a user interface control, shown at reference numeral 560, to bring attendees in the virtual waiting room into the virtual meeting room which results in the temporary virtual meeting room resources being returned to the system.

Figure 9A:
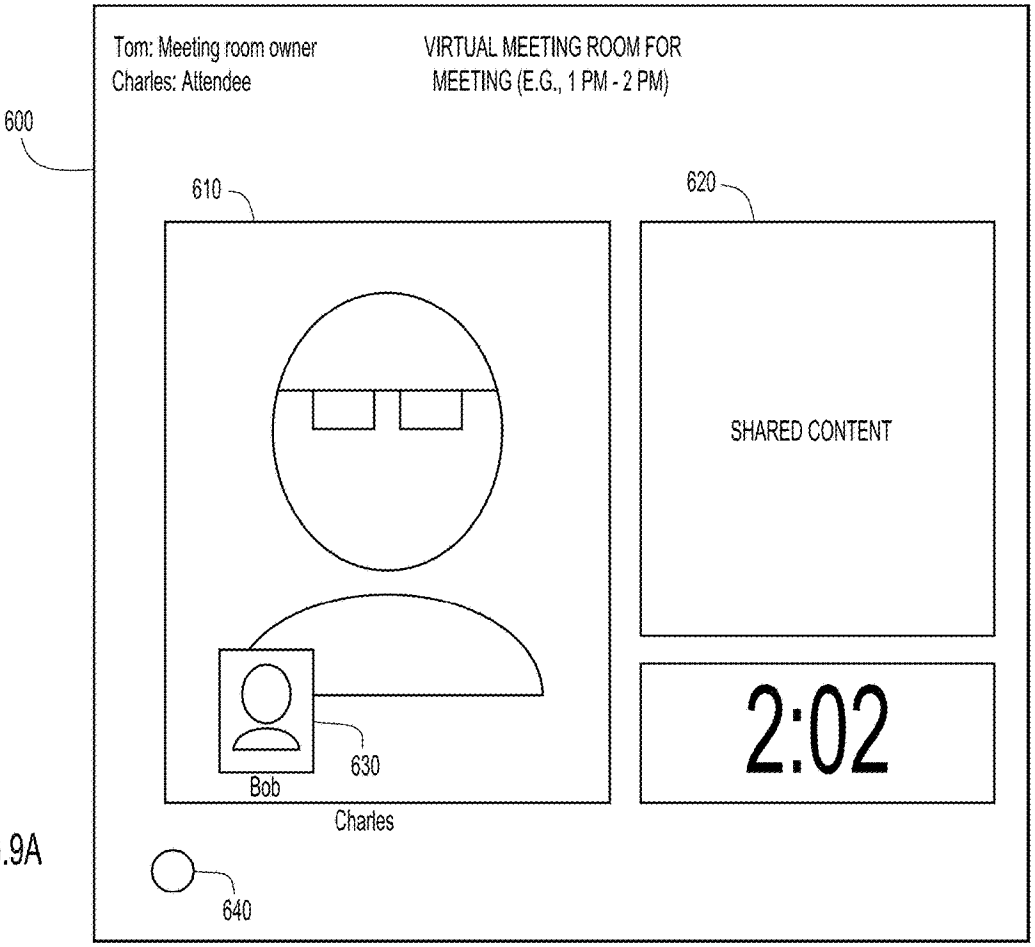
FIGS. 9A-9D illustrate a user interface presented to a meeting room owner during progressive scenarios involving interaction between the meeting room owner and an attendee in the virtual waiting room, according to an example embodiment.

FIGS. 9A-9D illustrate progressively more complex scenarios for interactions between a meeting room owner and a waiting attendee. FIG. 9A illustrates an example in which a virtual meeting room owner Tom is conducting a meeting with Charles. The meeting room 600 includes video of Charles shown at 610, and Tom's shared content (whiteboard, documents, slides, etc.) 620. During this meeting in virtual meeting room 600, a new meeting attendee Bob arrives. Since Tom is still in a meeting with Charles, Bob is automatically put into a virtual waiting room, according to any of the embodiments described above in connection with FIGS. 1-7D. Video for Bob, shown at reference numeral 630, is presented to Tom. Only Tom, the meeting room owner, sees the video of Bob. Tom can signal to Bob that he is still in another meeting (with Charles), and asks Bob to wait. For example, Tom may send a chat message, click a button (shown at 640) that will cause the meeting server to notify Bob that Tom is still in a meeting, etc. The notification to Tom that Bob has joined can have a quick reply option with one or more pre-established ("canned") responses that can be selected.

Figure 9B:
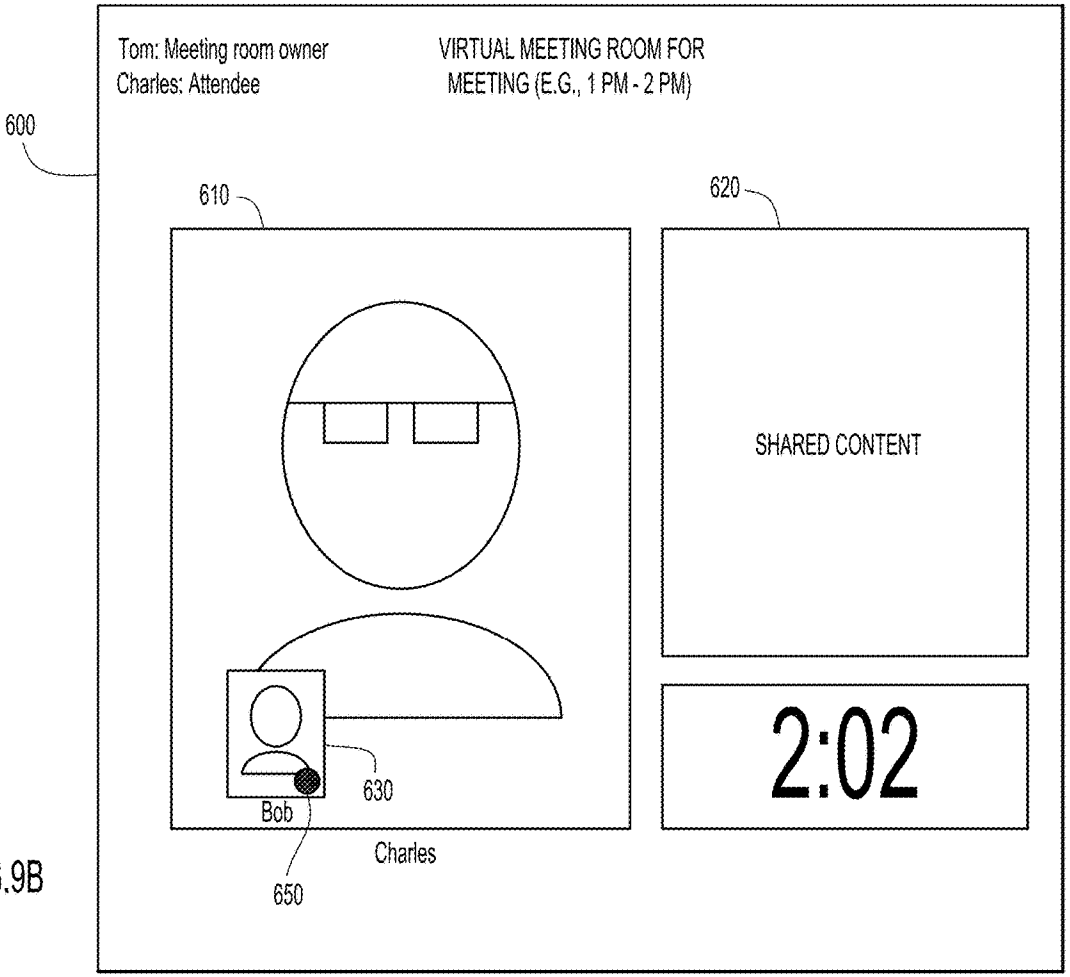

FIG. 9B illustrates a scenario similar to FIG. 9A but taken a step further. In this scenario, the meeting room owner Tom asks the meeting attendee Charles to hold for a moment. Tom then clicks a button 650 that causes the meeting server to switch to a full voice and video conversation with Bob (who is in the virtual waiting room). The meeting room owner Tom and attendee Bob briefly interact via voice and video. By clicking the button again, Tom returns to the meeting room with Charles and Bob stays in the virtual waiting room. When Tom ends the meeting with Charles, Bob is admitted to the meeting room with Tom.

Figure 9C:
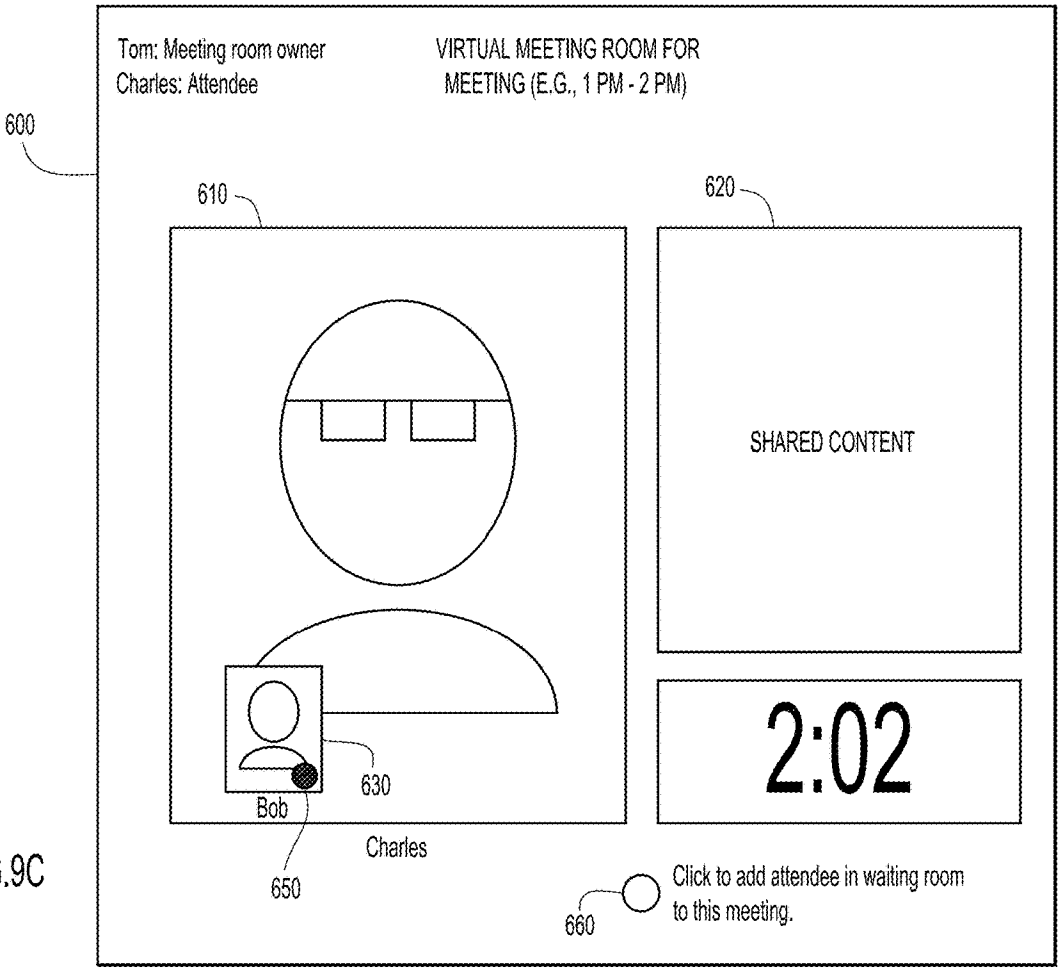
Figure 9D:
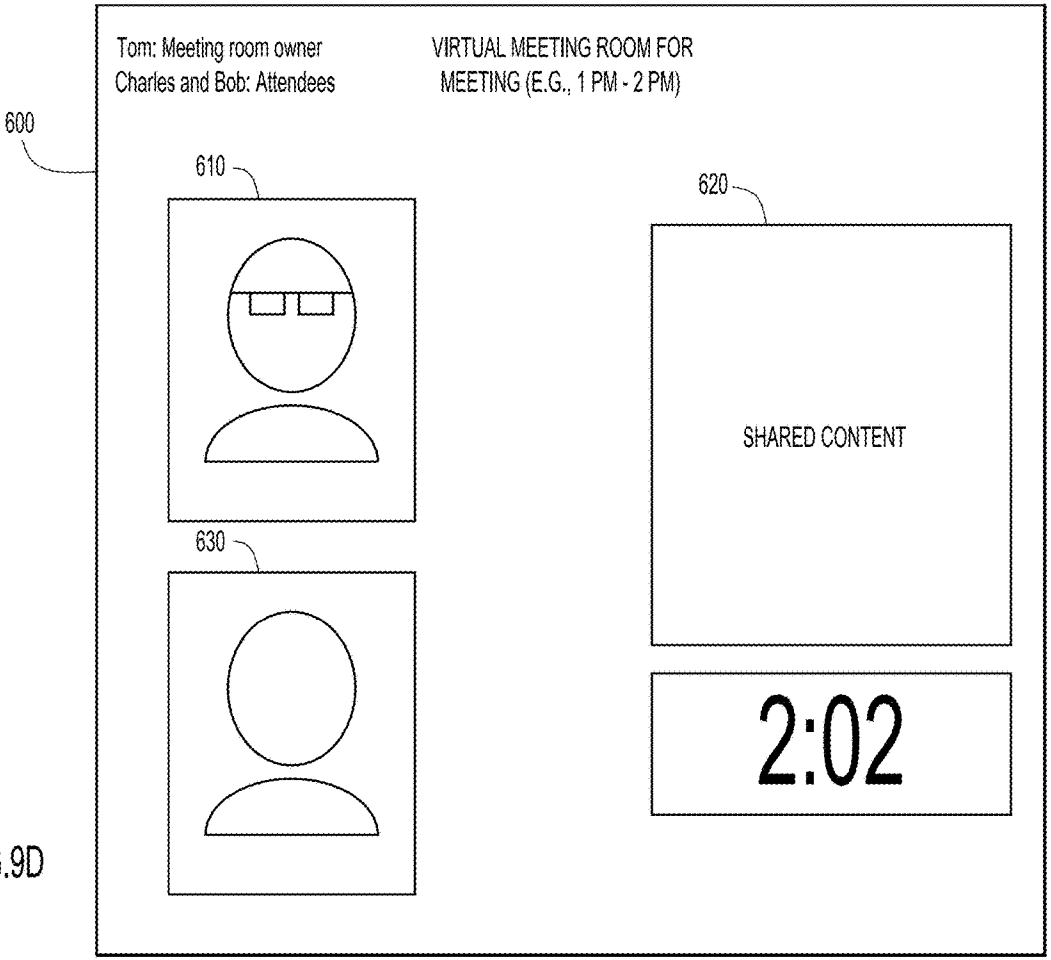

FIGS. 9C and 9D illustrate a scenario similar to FIG. 8B, but taken still further. At some point after the meeting room owner Tom interacts with Bob via voice and video, by clicking the button 650 and clicking the button 650 again to return to the meeting with Charles, the meeting room owner Tom decides that Bob should be admitted/added to the in-progress meeting with Charles. To add/admit Bob to the meeting, the meeting room owner Tom clicks another button 660. When this happens, Bob is added to the in-progress meeting and an example of the user interface that Tom sees is shown in FIG. 9D. Bob is moved from the virtual waiting room and added to the virtual meeting room with any other attendee already in the virtual meeting room. The meeting room owner Tom, attendee Charles and attendee Bob can all interact with each other in the virtual meeting room. Once Bob is added to the virtual meeting room, and assuming there is nobody else in the virtual waiting room, the virtual waiting room can be closed and the resources for the virtual waiting room can be released.

When the virtual waiting room concepts are applied to a video conference bridge, the virtual waiting room is a temporary waiting bridge for users who are joining a video conference bridge before the allocated start time or before the host/bridge owner is ready for them to join. Furthermore, the participants and host would be provided with feedback mechanisms to make the waiting user experience and comfortable, natural and productive as possible as described above in connection with FIGS. 3-7D. Like the virtual waiting room, the temporary waiting bridge is supported by a secondary pool of bridge resources made available and allocated ahead of meeting start times (say within 5 minutes), as described above.

Moreover, like the examples described above, an 'early condition' is set on the server if the video conference bridge is already in use and new attendees, not in the current meeting are attempting to join. The early condition can exceed the end time of the previous meeting in the case of a meeting overrun. This caters for the case where attendees join on time or late but the previous meeting is still running. While in this mode attendees who join ahead of the host being ready for the next meeting are temporarily hosted on the temporary allocated bridge resource.

To summarize, embodiments are presented herein to prevent next meeting attendees from inadvertently barging into an in-progress meeting in a virtual meeting room. A visual feedback is presented to attendees to show that the virtual meeting room/video conference bridge is currently in use and that they are in a holding place, i.e., a virtual meeting room or temporary conference bridge. A visual feedback may be presented to the host/owner to show that people are gathering or in place for the next meeting. A mechanism may be provided to allow the host to indicate to newly arriving attendees that the meeting will begin shortly. A meeting can start more naturally without awkward interruptions in a previous meeting.

Figure 10:
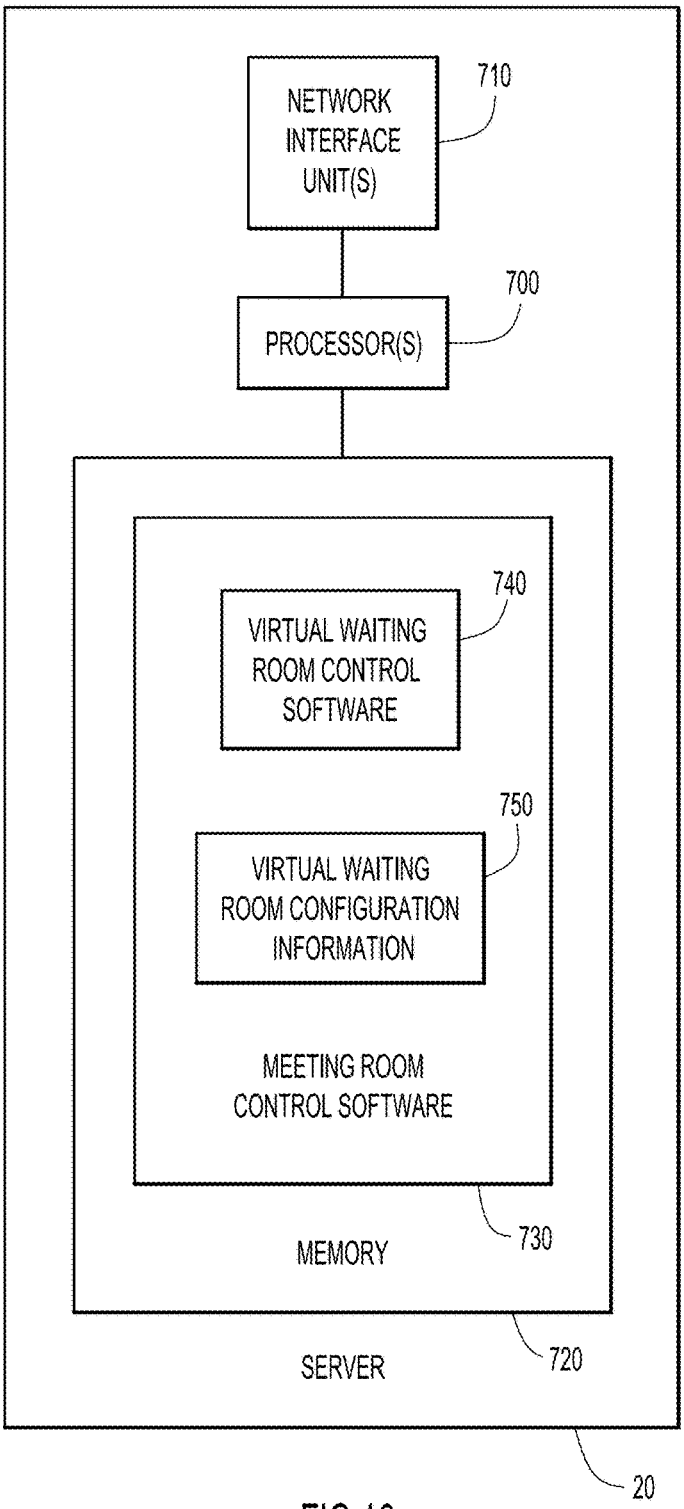
FIG. 10 is a block diagram of a server configured to support the virtual waiting room according to an example embodiment.

FIG. 10 illustrates a block diagram of the server 20, according to an example embodiment. The server 20 may take the form of an application running in a data center or cloud computing environment. The server 20 includes one or more processors 700, a network interface unit 710 and a memory 720. The processor 700 may be a microprocessor or microcontroller, or several instances of such devices. The network interface unit 710 may include one or more network interface cards that enable network connectivity for the server 20.

The memory may 720 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 720 may comprise one or more tangible (non-transitory) computer readable storage media (e.g., memory device(s)) encoded with software or firmware that comprises computer executable instructions.

To this end, the memory 720 stores instructions for meeting room control software 730, which in turn includes instructions for virtual waiting room control software 740 and virtual waiting room configuration information 750 indicating default configurations as well as configurations set by a meeting room owner. When processor(s) 700 execute the meeting room control software 730, the processor(s) 700 perform the operations described above in connection with FIGS. 1-9D.

The above description is intended by way of example only. Various modifications and structural changes may be made therein without departing from the scope of the concepts described herein and within the scope and range of equivalents of the claims.

What is claimed is:

1. A method comprising:

at a server that manages meetings in a virtual meeting room on behalf of a virtual meeting room owner:

receiving a request from an attendee to join a meeting in the virtual meeting room;

displaying a graphical user interface control with a first prompt to the virtual meeting room owner to open a virtual waiting room;

determining an identity of the attendee, wherein the identity of the attendee includes a hierarchical relationship level of the attendee within an organization;

determining, based on configurations set by the virtual meeting room owner, whether to connect the attendee to the virtual waiting room;

automatically connecting the attendee to the virtual waiting room in accordance with the configurations set by the virtual meeting room owner and in accordance with the identity of the attendee; and displaying a second prompt to the virtual meeting room owner indicating that the attendee is in the virtual waiting room waiting for the start of the meeting, the second prompt further indicating the name and hierarchal relationship level of the attendee within the organization to enable the virtual meeting room owner to determine a length of time to keep the attendee waiting in the virtual waiting room.

2. The method of claim 1, further comprising instantiating the virtual waiting room with a pool of resources.

3. The method of claim 1, further comprising determining that the virtual meeting room owner is not available to join the meeting because the virtual meeting room owner has not connected to the virtual meeting room.

4. The method of claim 1, further comprising determining that the virtual meeting room owner is not available to join the meeting because the virtual meeting room owner is in a meeting still in-progress in the virtual meeting room.

5. The method of claim 1, further comprising automatically opening the virtual waiting room a predetermined period of time prior to the start time of the meeting, and wherein connecting comprises automatically connecting the attendee to the virtual meeting room.

6. The method of claim 1, further comprising automatically opening the virtual waiting room at a predetermined time, and wherein connecting comprises automatically connecting the attendee to the virtual meeting room.

7. The method of claim 4, further comprising displaying to one or more attendees in the virtual waiting room a message indicating that the virtual meeting room owner is not yet available.

8. The method of claim 7, further comprising playing to the one or more attendees in the virtual waiting room a video program.

9. The method of claim 7, further comprising displaying to one or more attendees a list of the attendees in the virtual waiting room.

10. The method of claim 7, further comprising enabling audio, video and content sharing interactions between multiple attendees in the virtual waiting which are comparable to interactions available in the virtual meeting room.

11. The method of claim 4, further comprising displaying to the virtual meeting room owner a message indicating how many people are in the virtual waiting room.

12. The method of claim 4, further comprising displaying only to the virtual meeting room owner a notification that the attendee for a next meeting is in the virtual waiting room.

13. The method of claim 12, further comprising receiving from the virtual meeting room owner a command to open an audio or video connection to the attendee in the virtual waiting room to allow audio or video communication between the attendee and virtual meeting room owner.

14. The method of claim 13, further comprising receiving from the virtual meeting room owner a command to close the audio or video connection to the attendee in the virtual waiting room.

15. The method of claim 13, further comprising receiving from the virtual meeting room owner a command to add the attendee who is in the virtual waiting room into the virtual meeting room.

16. An apparatus comprising:

a network interface unit configured for network communication with user devices of attendees of a virtual meeting in virtual meeting room that is managed on behalf of a virtual meeting room owner;

a processor coupled to the network interface unit, and configured to:

receive a request from an attendee to join a meeting in the virtual meeting room;

display a graphical user interface control with a first prompt to the virtual meeting room owner to open a virtual waiting room;

determine an identity of the attendee, wherein the identity of the attendee includes a hierarchical relationship level of the attendee within an organization;

determine, based on configurations set by the virtual meeting room owner, whether to connect the attendee to the virtual waiting room;

automatically connect the attendee to the virtual waiting room in accordance with the configurations set by the virtual meeting room owner and in accordance with the identity of the attendee; and display a second prompt to the virtual meeting room owner indicating that the attendee is in the virtual waiting room waiting for the start of the meeting, the second prompt further indicating the name and hierarchal relationship level of the attendee within the organization to enable the virtual meeting room owner to determine a length of time to keep the attendee waiting in the virtual waiting room.

17. The apparatus of claim 16, wherein the processor is further configured to determine that the virtual meeting room owner is in a meeting still-in progress in the virtual meeting room.

18. The apparatus of claim 16, wherein the processor is configured to automatically open the virtual waiting room a predetermined of time prior to the start time of the meeting, and to automatically connect the attendee to the virtual meeting room.

19. The apparatus of claim 16, wherein the processor is configured to receive from the virtual meeting room owner a command to open an audio or video connection to the attendee in the virtual meeting room to allow audio or video communication between the attendee and the virtual meeting room owner.

20. The apparatus of claim 19, wherein the processor is configured to receive from the virtual meeting room owner a command to add the attendee who is in the virtual waiting room into the virtual meeting room.

21. A non-transitory computer readable storage media storing instructions that, when executed by a processor, cause the processor to:

receive a request from an attendee to join a meeting in a virtual meeting room that is managed on behalf of a virtual meeting room owner;

display a graphical user interface control with a prompt to the virtual meeting room owner to open a virtual waiting room;

determine an identity of the attendee, wherein the identity of the attendee includes a hierarchical relationship level of the attendee within an organization;

determine, based on configurations set by the virtual meeting room owner, whether to connect the attendee to the virtual waiting room;

automatically connect the attendee to the virtual waiting room in accordance with the configurations set by the virtual meeting room owner and in accordance with the identity of the attendee; and display a second prompt to the virtual meeting room owner indicating that the attendee is in the virtual waiting room waiting for the start of the meeting, the second prompt further indicating the name and hierarchal relationship level of the attendee within the organization to enable the virtual meeting room owner to determine a length of time to keep the attendee waiting in the virtual waiting room.

22. The non-transitory computer readable storage media of claim 21, further comprising instructions that cause the processor to determine that the virtual meeting room owner is in a meeting still-in progress in the virtual meeting room.

23. The non-transitory computer readable storage media of claim 21, further comprising instructions that cause the processor to automatically open the virtual waiting room a predetermined of time prior to the start time of the meeting, and to automatically connect the attendee to the virtual meeting room.

24. The non-transitory computer readable storage media of claim 21, further comprising instructions that cause the processor to receive from the virtual meeting room owner a command to open an audio or video connection to the attendee in the virtual meeting room to allow audio or video communication between the attendee and the virtual meeting room owner.

25. The non-transitory computer readable storage media of claim 24, further comprising instructions that cause the processor to receive from the virtual meeting room owner a command to add the attendee who is in the virtual waiting room into the virtual meeting room.

26. The apparatus of claim 16, wherein the processor is further configured to:

instantiate the virtual waiting room with a pool of resources.

27. The apparatus of claim 16, wherein the processor is further configured to:

display to one or more attendees in the virtual waiting room a message indicating that the virtual meeting room owner is not yet available.

28. The apparatus of claim 27, wherein the processor is further configured to:

play to the one or more attendees in the virtual waiting room a video program.

29. The apparatus of claim 27, wherein the processor is further configured to:

display to one or more attendees a list of the attendees in the virtual waiting room.

30. The apparatus of claim 27, wherein the processor is further configured to:

enable audio, video and content sharing interactions between multiple attendees in the virtual waiting which are comparable to interactions available in the virtual meeting room.

31. The non-transitory computer readable storage media of claim 21, further comprising instructions that cause the processor to:

instantiate the virtual waiting room with a pool of resources.

32. The non-transitory computer readable storage media of claim 21, further comprising instructions that cause the processor to:

display to one or more attendees in the virtual waiting room a message indicating that the virtual meeting room owner is not yet available.

33. The non-transitory computer readable storage media of claim 32, further comprising instructions that cause the processor to:

display to one or more attendees a list of the attendees in the virtual waiting room.

34. The non-transitory computer readable storage media of claim 32, further comprising instructions that cause the processor to:

enable audio, video and content sharing interactions between multiple attendees in the virtual waiting which are comparable to interactions available in the virtual meeting room.

*35. An apparatus comprising:*

*a network interface configured to enable communications, in a video conference, between a meeting host participants via user devices;*

*a memory configured to store instructions and data to support the video conference; and*

*one or more processors coupled to the network interface and the memory, and configured to:*

*establish a virtual meeting room associated with the meeting host;*

*provide a virtual waiting room configuration option to place prospective participants in a virtual waiting room instead of the virtual meeting room;*

*receive a request from a prospective participant to join a video conference in the virtual meeting room;*

*display a graphical user interface control with a first prompt to the meeting host to open the virtual waiting room;*

*determine whether the meeting host and the prospective participant have a predetermined relationship by matching information about the prospective participant against stored information about one or more prospective participants, wherein the stored infor-*

*mation includes an identifier of one or more prospective participants, an indication of an organization associated with one or more prospective participants, or both;*

*if the prospective participant has a predetermined relationship with the meeting host, admit the prospective participant to the virtual meeting room;*

*if the prospective participant does not have a predetermined relationship with the meeting host, admit the prospective participant to the virtual waiting room;*

*when the prospective participant is admitted to the virtual waiting room, display a second prompt to the meeting host indicating that the prospective participant is in the virtual waiting room, the second prompt further providing an identifier associated with the prospective participant and relationship level of the prospective participant to the organization of the meeting host to enable the meeting host to a length of time to keep the prospective participant waiting in the virtual waiting room before admitting the prospective participant to the virtual meeting room from the virtual waiting room as a meeting participant; and*

*if the meeting host chooses not to admit the prospective participant to the virtual meeting room, allow the meeting host to interact with the prospective participant in the virtual waiting room.*

*36. The apparatus of claim 35, wherein the virtual meeting room has been previously assigned to the meeting host for recurring use by the meeting host.*

*37. The apparatus of claim 35, wherein the stored information about one or more prospective participants comprises an indication that the prospective participant is a member of the same organization as the meeting host.*

*38. The apparatus of claim 35, wherein the stored information about one or more prospective participants comprises an indication that the prospective participant is a member of an organization allowed by the meeting host.*

*39. The apparatus of claim 35, wherein the interaction with the prospective participant in the virtual waiting room comprises audio and video communication between the prospective participant and the meeting host.*

*40. The apparatus of claim 35, further wherein the one or more processors are further configured to receive from the meeting host a command to move the prospective participant from the virtual waiting room to the virtual meeting room as a meeting participant.*

*41. The apparatus of claim 35, wherein the one or more processors are configured to generate data for displaying a message to the prospective participant in the virtual waiting room.*

*42. The apparatus of claim 35, wherein the one or more processors are further configured to generate data for displaying to the prospective participant in the virtual waiting room a list of all prospective participants in the virtual waiting room.*

*43. The apparatus of claim 35, wherein the one or more processors are configured to enable audio, video and content sharing interactions between multiple prospective participants in the virtual waiting room.*

*44. The apparatus of claim 35, wherein the one or more processors are configured to generate data for displaying to the meeting host a list of the prospective participants in the virtual waiting room.*

*45. A method for providing virtual rooms for audio and video-enabled online meetings comprising:*

*establishing a first virtual room, the first virtual room associated with a meeting host, the first virtual room having been previously assigned to a meeting host for recurring use by the meeting host;*

*establishing a second virtual room, the second virtual room associated with the meeting host;*

*receiving, during an online meeting in the first virtual room, a request from a prospective participant to join an online meeting with the meeting host;*

*displaying a graphical user interface control with a first prompt to the meeting host to open a virtual waiting room;*

*determining a relationship between the prospective participant and the meeting host based on an indication of the relationship between the prospective participant and the meeting host;*

*determining, based on configurations set by the meeting host, whether to connect the prospective participant to the first virtual room or the second virtual room;*

*connecting the prospective participant to the second virtual room in accordance with the determination based on the configurations set by the meeting host and the relationship between the prospective participant and the meeting host; and*

*displaying a second prompt to the meeting host indicating that the prospective participant is in the second virtual room, the second prompt further indicating an identifier associated with the prospective participant and relationship level of the prospective participant to the organization of the meeting host to enable the meeting host to determine a length of time to keep the prospective participant waiting in the virtual waiting room before admitting the prospective participant to the online meeting in the first virtual room from the second virtual room as a meeting participant;*

*wherein the first virtual room is a virtual meeting room and the second virtual room is a virtual waiting room.*

*46. The method of claim 45, wherein the relationship between the prospective participant and the meeting host comprises an indication that the prospective participant is a member of the same organization as the meeting host.*

*47. The method of claim 45, wherein the relationship between the prospective participant and the meeting host comprises an indication that the prospective participant is a member of an organization allowed by the meeting host.*

*48. The method of claim 45, further comprising opening a connection to the prospective participant in the second virtual room to allow audio and video communication between the prospective participant in the second virtual room and the meeting host.*

*49. The method of claim 45, further comprising receiving from the meeting host a command to move the prospective participant from the second virtual room to the first virtual room as a meeting participant.*

*50. The method of claim 45, further comprising displaying to the prospective participant in the second virtual room a message from the meeting host.*

*51. The method of claim 45, further comprising displaying to the prospective participant in the second virtual room a list of all prospective participants in the second virtual room.*

*52. The method of claim 45, further comprising enabling audio, video and content sharing interactions between the prospective participants in the second virtual room.*

*53. The method of claim 45, wherein the relationship between the prospective participant and the meeting host comprises a previously registered participant identity.*

*54. A method for conducting a video conference comprising:*

*providing resources to support a video conference whereby a meeting host can communicate with meeting participants via video and audio;*

*establishing a virtual meeting room associated with the meeting host;*

*providing a virtual waiting room configuration option to place prospective participants in a virtual waiting room instead of the virtual meeting room;*

*receiving a request from a prospective participant to join a video conference in the virtual meeting room;*

*displaying a graphical user interface control with a first prompt to the meeting host to open the virtual waiting room;*

*determining whether the meeting host and the prospective participant have a predetermined relationship by matching information about the prospective participant against stored information about one or more prospective participants, wherein the stored information includes an identifier of one or more prospective participants, an indication of an organization associated with one or more prospective participants, or both;*

*admitting the prospective participant to the virtual waiting room based upon the determination that there is not a predetermined relationship between the prospective participant and the meeting host;*

*after the prospective participant is admitted to the virtual waiting room, displaying a second prompt to the meeting host indicating that the prospective participant is in the virtual waiting room, the second prompt further providing an identifier associated with the prospective participant and relationship level of the prospective participant to the organization of the meeting host to enable the meeting host to determine a length of time to keep the prospective participant waiting in the virtual waiting room before admitting the prospective participant to the virtual meeting room from the virtual waiting room as a meeting participant, allowing the meeting host to interact with the prospective participant in the virtual waiting room.*

*55. The method of claim 54, wherein the virtual meeting room has been previously assigned to the meeting host for recurring use by the meeting host.*

*56. The method of claim 54, wherein the stored information about one or more prospective participants comprises an indication that the prospective participant is a member of the same organization as the meeting host.*

*57. The method of claim 54, wherein the stored information about one or more prospective participants comprises an indication that the prospective participant is a member of an organization allowed by the meeting host.*

*58. The method of claim 54, wherein the interaction with the prospective participant in the virtual waiting room comprises audio and video communication between the prospective participant and the meeting host.*

*59. The method of claim 54, further comprising receiving from the meeting host a command to move the prospective participant from the virtual waiting room to the virtual meeting room as a meeting participant.*

*60. The method of claim 54, further comprising the step of displaying a message to the prospective participant in the virtual waiting room.*

*61. The method of claim 54, further comprising the step of displaying to the prospective participant in the virtual waiting room a list of all prospective participants in the virtual waiting room.*

*62. The method of claim 54, further comprising the step of enabling audio, video and content sharing interactions between multiple prospective participants in the virtual waiting room.*

*63. The method of claim 54, further comprising the step of displaying to the meeting host a list of the prospective participants in the virtual waiting room.*

*64. The method of claim 54, wherein the relationship between the prospective participant and the meeting host comprises a previously registered participant identity.*

* * * * *